US009823400B2

(12) United States Patent
Hatanaka et al.

(10) Patent No.: US 9,823,400 B2
(45) Date of Patent: *Nov. 21, 2017

(54) CURED FILM FORMATION COMPOSITION, ORIENTATION MATERIAL, AND RETARDATION MATERIAL

(71) Applicant: NISSAN CHEMICAL INDUSTRIES, LTD., Tokyo (JP)

(72) Inventors: Tadashi Hatanaka, Funabashi (JP); Tomohisa Ishida, Funabashi (JP); Shojiro Yukawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,456

(22) Filed: Sep. 15, 2015

(65) Prior Publication Data

US 2016/0033702 A1 Feb. 4, 2016

Related U.S. Application Data

(63) Continuation of application No. 14/351,516, filed as application No. PCT/JP2012/076101 on Oct. 9, 2012, now Pat. No. 9,244,199.

(30) Foreign Application Priority Data

Oct. 11, 2011 (JP) .................. 2011-224295

(51) Int. Cl.
*G02B 1/08* (2006.01)
*C08K 5/23* (2006.01)
(Continued)

(52) U.S. Cl.
CPC .......... *G02B 5/3083* (2013.01); *C08F 120/04* (2013.01); *C08F 120/28* (2013.01);
(Continued)

(58) Field of Classification Search
CPC ........ G02B 1/08; G02B 5/3016; C09D 7/125; C08L 1/02; C08K 5/23
See application file for complete search history.

(56) References Cited

U.S. PATENT DOCUMENTS 6,340,506 B1   1/2002  Buchecker et al.
2005/0053790 A1* 3/2005  Kato .................... C08F 8/18
                                                           428/421

(Continued)

FOREIGN PATENT DOCUMENTS

JP   10-232365 A    9/1998
JP   2001-517719 A  10/2001
(Continued)

OTHER PUBLICATIONS

International Search Report issued in International Patent Application No. PCT/JP2012/076101 dated Nov. 6, 2012.
(Continued)

*Primary Examiner* — Michael L Leonard
(74) *Attorney, Agent, or Firm* — Oliff PLC

(57) ABSTRACT

There is provided a cured-film formation composition that forms a cured film having excellent photoreaction efficiency and solvent resistance, and high adhesion, an orientation material for photo-alignment, and a retardation material formed with the orientation material.

20 Claims, 1 Drawing Sheet

(51) Int. Cl.
 *G02B 5/30* (2006.01)
 *C08L 101/02* (2006.01)
 *C09D 7/12* (2006.01)
 *C08J 7/04* (2006.01)
 *C09D 201/02* (2006.01)
 *C09D 201/08* (2006.01)
 *C08K 5/05* (2006.01)
 *C08F 120/04* (2006.01)
 *C08F 120/28* (2006.01)
 *G02F 1/1335* (2006.01)

(52) U.S. Cl.
 CPC ............... *C08J 7/047* (2013.01); *C08K 5/05* (2013.01); *C08K 5/23* (2013.01); *C08L 101/02* (2013.01); *C09D 7/125* (2013.01); *C09D 201/025* (2013.01); *C09D 201/08* (2013.01); *G02B 1/08* (2013.01); *G02B 5/3016* (2013.01); *G02F 1/133528* (2013.01); *C08J 2301/12* (2013.01); *C08J 2400/105* (2013.01); *C08J 2400/106* (2013.01)

(56) References Cited

U.S. PATENT DOCUMENTS

| | | |
|---|---|---|
| 2008/0227033 A1 | 9/2008 | Lee et al. |
| 2012/0114879 A1 | 5/2012 | Hatanaka et al. |
| 2013/0029087 A1* | 1/2013 | Hatanaka ............ C09D 133/062 428/98 |

FOREIGN PATENT DOCUMENTS

| | | | |
|---|---|---|---|
| JP | 3611342 B2 | 1/2005 | |
| JP | 2005-049865 A | 2/2005 | |
| JP | 2007-121721 A | 5/2007 | |
| JP | 2009-058584 A | 3/2009 | |
| JP | 2009-109831 A | 5/2009 | |
| JP | WO 2011126022 A1 * | 10/2011 | ......... C09D 133/062 |
| WO | 2011/010635 A1 | 1/2011 | |
| WO | 2011/126022 A1 | 10/2011 | |

OTHER PUBLICATIONS

Written Opinion of the International Search Authority issued in International Patent Application No. PCT/JP2012/076101 dated Nov. 6, 2012.

* cited by examiner

CURED FILM FORMATION COMPOSITION, ORIENTATION MATERIAL, AND RETARDATION MATERIAL

This is a Continuation of application Ser. No. 14/351,516 filed Apr. 11, 2014, which is a National Stage Application of PCT/JP2012/076101 filed Oct. 9, 2012. The entire disclosures of the prior applications are hereby incorporated by reference herein their entirety.

TECHNICAL FIELD

The present invention relates to a cured-film formation composition, an orientation material, and a retardation material.

BACKGROUND ART

Recently, in the field of displays such as televisions including liquid crystal panels, 3D displays with which 3D images can be enjoyed have been developed in an effort of achieving higher performance. In such 3D displays, a stereoscopic image can be displayed by, for example, making the right eye of a viewer see an image for the right eye and making the left eye of the viewer see an image for the left eye.

Various 3D display methods for displaying 3D images can be used, and examples of such methods requiring no special eyeglasses include a lenticular lens method and a parallax barrier method.

As one of display methods for viewers to see 3D images with eyeglasses, a circularly polarized light glasses method is known (see Patent Document 1, for example).

In a 3D display using the circularly polarized light glasses method, a retardation material is generally arranged on a display element for forming an image of a liquid crystal panel and the like. In this retardation material, two types of multiple retardation regions having different retardation characteristics are regularly arranged to constitute a retardation member that is patterned. In the present specification, a retardation member thus patterned in which a plurality of retardation regions having different retardation characteristics are arranged is called a patterned retarder hereinafter.

The patterned retarder can be fabricated by optically patterning a retardation substance including a polymerizable liquid crystal as disclosed in Patent Document 2, for example. In the optical patterning of the retardation substance including a polymerizable liquid crystal, a photo-alignment technique known for forming an orientation material for a liquid crystal panel is used. More specifically, a coating film made of a material having photo-alignment properties is provided on a substrate, and two types of polarized beams having different polarization directions are radiated on this coating film. Thus, a photo-alignment film is obtained as an orientation material in which two types of liquid crystal alignment regions are formed and the directions of alignment control of liquid crystals in the regions are different. Onto this photo-alignment film, a retardation substance containing a polymerizable liquid crystal in a solution state is applied to perform alignment of the polymerizable liquid crystal. Subsequently, the polymerizable liquid crystal thus aligned is cured to form a patterned retarder.

As materials having photo-alignment properties that can be used in orientation material formation using a photo-alignment technique for liquid crystal panels, an acrylic resin and a polyimide resin, for example, are known that have in a side chain thereof a photodimerized moiety such as a cinnamoyl group and a chalcone group. It is disclosed that these resins exhibit a property of controlling alignment of liquid crystals (hereinafter, also called liquid crystal alignment properties) by polarized UV irradiation (see Patent Document 3 to Patent Document 5).

PRIOR ART DOCUMENTS

Patent Documents

Patent Document 1: Japanese Patent Application Publication No. H10-232365
Patent Document 2: Japanese Patent Application Publication No. 2005-49865
Patent Document 3: Japanese Patent No. 3611342
Patent Document 4: Japanese Patent Application Publication No. 2009-058584
Patent Document 5: Published Japanese Translation of PCT Application No. 2001-517719

SUMMARY OF THE INVENTION

Problem to be Solved by the Invention

However, the study of the inventors of the present invention indicates that acrylic resins having in a side chain of a photodimerized moiety such as a cinnamoyl group and a chalcone group, for example, described in Patent Document 3 to Patent Document 5 do not provide sufficient properties when the acrylic resins are used for formation of a retardation material.

When such acrylic resins are used to form an orientation material and align a polymerizable liquid crystal, photo-crosslinking will proceed due to photodimerization reaction.

In production of a retardation material, unlike in production of a liquid crystal panel requiring dimerization reaction only on the surface of an orientation material with photo-alignment properties, a polymerizable liquid crystal in a solution state is applied onto the orientation material, which requires irradiation with polarized light in a large exposure amount until the resistance of the orientation material to a polarizable liquid crystal solution appears.

In particular, irradiating the acrylic resin with polarized UV light to form an orientation material and optically patterning a retardation substance including a polymerizable liquid crystal using the orientation material requires a large exposure amount of polarized UV light. The exposure amount of the polarized UV light is much larger than the exposure amount (e.g., about 100 mJ/cm$^2$) of polarized UV light sufficient to align a liquid crystal for a general liquid crystal panel.

Consequently, the alignment sensitivity of a conventional orientation material is significantly reduced.

A technique is known in which a cross-linking agent is added to the resin of the conventional material in order to make the resin have such solution resistance. It is known, however, that a three-dimensional structure is formed inside a coating film that is formed after heat-curing reaction is performed with a cross-linking agent, whereby the photo-reactivity is reduced. In other words, the alignment sensitivity is significantly reduced, and even if a conventional material with the cross-linking agent added is used, a desired effect cannot be obtained.

In view of the foregoing, a photo-alignment technique that can improve the alignment sensitivity of an orientation material to reduce the exposure amount of polarized UV light and a cured-film formation composition that is used for forming the orientation material are desired. A technique is also desired that can efficiently provide a patterned retarder.

In production of a patterned retarder for a 3D display using the photo-alignment technique, the patterned retarder has been conventionally formed on a glass substrate. However, in recent years, to meet the demand for production cost reduction, it is desired that the pattern retardation material be produced on an inexpensive resin film such as a triacetyl-cellulose (TAC) film or a cycloolefin polymer (COP) by what is called roll-to-roll production method.

However, a photo-alignment film formed of a conventional material as described above has low adhesion to a resin film, and it is difficult to produce a patterned retarder that is highly reliable when formed on the resin film.

Thus, an orientation material is desired that has high adhesion, can form a highly reliable retardation material even on a resin film such as a TAC film, and can be used in the photo-alignment technique, and also a cured-film formation composition for forming the orientation material is desired.

The present invention has been made based on the above-described findings and study results. An object of the present invention is to provide a cured-film formation composition for providing an orientation material that has high photoreaction efficiency and excellent solvent resistance, and with which a polymerizable liquid crystal can be aligned even on a resin film in a highly sensitive manner.

Another object of the present invention is to provide an orientation material that is obtained from the cured-film formation composition, has high photoreaction efficiency and excellent solvent resistance, and that enables a polymerizable liquid crystal to be aligned even on a resin film in a highly sensitive manner, and to provide a retardation material that is formed with the orientation material.

The other objects and advantages of the present invention will be apparent from the following description.

Means for Solving the Problem

A first aspect of the present invention relates to a cured-film formation composition characterized by comprising:
  a component (A) that is a compound having a photo-aligning group and one substituent selected from a hydroxy group, a carboxy group, and an amino group;
  a component (B) that is a hydrophilic polymer (excluding a melamine formaldehyde resin, a phenol novolac resin, cyclodextrin, and polyester polycarboxylic acid) having one or more substituents selected from a hydroxy group, a carboxy group, and an amino group; and
  a component (C) that is a cross-linking agent that reacts with the component (A) and the component (B) and reacts at a temperature lower than a sublimation temperature of the component (A), in which
    when the component (B) is an acrylic polymer, the cured-film formation composition further comprises a component (E) that is an adhesion enhancing component.

In the first aspect of the present invention, the photo-aligning group of the component (A) is preferably a functional group having a structure to be photodimerized or photoisomerized.

In the first aspect of the present invention, the photo-aligning group of the component (A) is preferably a cinnamoyl group.

In the first aspect of the present invention, the photo-aligning group of the component (A) is preferably a group having an azobenzene structure.

In the first aspect of the present invention, the component (A) preferably has two or more hydroxy groups.

In the first aspect of the present invention, the component (B) is preferably at least one polymer selected from the group consisting of polyether polyol, polyester polyol, polycarbonate polyol, and polycaprolactone polyol.

In the first aspect of the present invention, the component (B) is preferably cellulose or a derivative of cellulose.

In the first aspect of the present invention, the component (B) is preferably an acrylic polymer having at least one of a polyethylene glycol ester group and a $C_{2\text{-}5}$ hydroxyalkyl ester group, and at least one of a carboxy group and a phenolic hydroxy group.

In the first aspect of the present invention, the component (B) is preferably an acrylic copolymer obtained by polymerization reaction of monomers containing at least one of a monomer having a polyethylene glycol ester group and a monomer having a $C_{2\text{-}5}$ hydroxyalkyl ester group and at least one of a monomer having a carboxy group and a monomer having a phenolic hydroxy group.

In the first aspect of the present invention, the component (B) is preferably hydroxyalkyl cyclodextrin or a derivative of hydroxyalkyl cyclodextrin.

In the first aspect of the present invention, the cross-linking agent of the component (C) is preferably more hydrophilic than the component (A).

In the first aspect of the present invention, the cross-linking agent of the component (C) is a cross-linking agent having a methylol group or an alkoxymethylol group.

In the first aspect of the present invention, the cured-film formation composition preferably further comprises a cross-linking catalyst as a component (D).

In the first aspect of the present invention, the cured-film formation composition preferably further includes hydroxy-group-containing multifunctional acrylate as the component (E).

In the first aspect of the present invention, the cured-film formation composition preferably further includes an inorganic particle as the component (E).

In the first aspect of the present invention, the cured-film formation composition preferably further includes ethyl acetate as the component (E).

In the first aspect of the present invention, a ratio of the component (A) to the component (B) is preferably 5:95 to 60:40 in a mass ratio.

In the first aspect of the present invention, 10 parts by mass to 100 parts by mass of the cross-linking agent of the component (C) is contained based on 100 parts by mass of the total amount of the component (A) and the component (B).

In the first aspect of the present invention, 0.01 parts by mass to 10 parts by mass of the cross-linking catalyst of the component (D) is contained based on 100 parts by mass of the total amount of the component (A) and the component (B).

In the first aspect of the present invention, 0.1 parts by mass to 20 parts by mass of the hydroxy-group-containing multifunctional acrylate of the component (E) is contained based on 100 parts by mass of total amount of the component (A) and the component (B).

In the first aspect of the present invention, 10 parts by mass to 50 parts by mass of the inorganic particle of the component (E) is contained based on 100 parts by mass of the total amount of the component (A) and the component (B).

In the first aspect of the present invention, the cured-film formation composition preferably further includes ethyl acetate.

A second aspect of the present invention relates to an orientation material characterized by being obtained with the cured-film formation composition of the first aspect of the present invention.

A third aspect of the present invention relates to a retardation material characterized by being formed with a cured film that is obtained from the cured-film formation composition of the first aspect of the present invention.

Effects of the Invention

The cured-film formation composition of the first aspect of the present invention contains a compound having a hydrophobic photo-aligning group and a hydrophilic heat-reactive moiety, a hydrophilic polymer, and a hydrophilic cross-linking agent. Thus, the orientation material formed of this composition contains the photo-aligning group unevenly distributed near the surface thereof and has a cross-linking structure therein.

In other words, according to the first aspect of the present invention, it is possible to provide a cured-film formation composition for providing an orientation material that has high photoreaction efficiency and excellent solvent resistance, and with which a polymerizable liquid crystal can be aligned even on a resin film in a highly sensitive manner.

According to the second aspect of the present invention, it is possible to provide an orientation material that has high photoreaction efficiency and excellent solvent resistance, and with which a polymerizable liquid crystal can be aligned even on a resin film in a highly sensitive manner.

According to the third aspect of the present invention, it is possible to provide a retardation material that can efficiently be formed and optically patterned even on a resin film.

MODES FOR CARRYING OUT THE INVENTION

As described in the foregoing, to efficiently produce a patterned retarder, for example, desired are a photo-alignment technique that can improve the alignment sensitivity of an orientation material for controlling the alignment of a liquid crystal and reduce the exposure amount of polarized UV light, and a cured-film formation composition that is used for forming the orientation material.

As a result of diligent research to meet such a request, the present inventors obtained findings on a structure of an orientation material that is suitable for production of the retardation material and has a high alignment sensitivity. The orientation material of an embodiment and the structure thereof will be described below with reference to the attached drawings.

In a technique conventionally used for photo-alignment films and the like, as described above, it is common to use a single polymer in which a photo-aligning group binds to a side chain of the polymer. For example, an acrylic resin or a polyimide resin having in a side chain of a photodimerized moiety such as a cinnamoyl group and a chalcone group is used.

In this case, the composition in a formed coating film is substantially uniform, and thus the photo-aligning group is not unevenly distributed inside the film formed. The photo-aligning group in the coating film is used and photocross-linking is performed by light exposure. In such a case, a significantly large amount of light exposure is necessary so that the resistance to a polymerizable liquid crystal solution and the like appears and thus the alignment sensitivity is reduced.

In contrast, the orientation material of the present embodiment has a structure in which a larger proportion of a photo-aligning group exists on the surface of the orientation material. Furthermore, before the photoreaction with the photo-aligning group, cross-linking reaction by thermal reaction with a cross-linking agent is performed inside the orientation material, whereby the resistance of the orientation material to the polymerizable liquid crystal or the solvent thereof is improved.

Figure 1A:
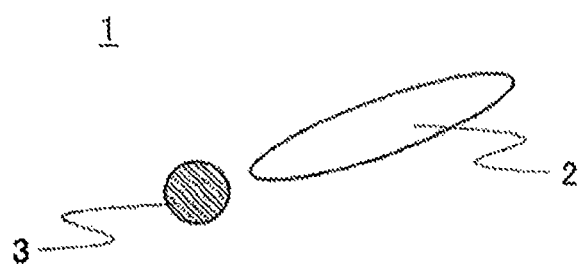
FIG. 1A is a diagram schematically illustrating a structure of a photo-alignment component.
Figure 1B:
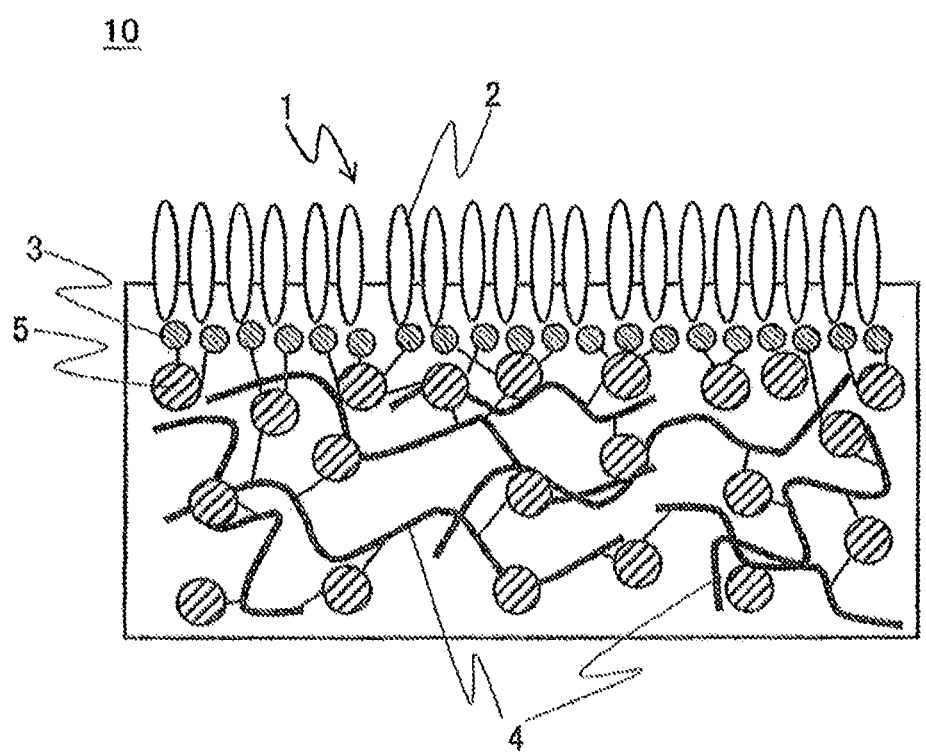
FIG. 1B is a sectional view schematically illustrating a structure of the orientation material of the embodiment.

FIG. 1A is a diagram schematically illustrating a structure of a photo-alignment component, and FIG. 1B is a sectional view schematically illustrating the structure of the orientation material of the present embodiment.

As described later, a cured-film formation composition of the present embodiment for forming the orientation material of the present embodiment contains a low molecular photo-alignment component, a polymer that is more hydrophilic than this low molecular photo-alignment component, and a cross-linking agent. These materials form a cured-film to form the orientation material. The low molecular alignment component is preferably a compound that is not a compound formed as a polymer, and is preferably a compound having a molecular weight lower than that of the hydrophilic polymer.

The low molecular photo-alignment component is a photo-alignment component 1 having a photoreactive moiety 2 and a heat-reactive moiety 3 as depicted in FIG. 1A. The photoreactive moiety 2 of the photo-alignment component 1 includes, as described later, for example, a cinnamoyl group, an azobenzene structure, a coumarin group, or an anthracene structure to be a hydrophobic photoreactive moiety 2. The heat-reactive moiety 3 of the photo-alignment component 1 includes, for example, a group such as a hydroxy group, a carboxy group, and an amino group that can react with a cross-linking agent to be a hydrophilic heat-reactive moiety 3 due to having such a group. The polymer is preferably a polymer having at least one of a hydroxy group and a carboxy group.

An orientation material 10 of the present embodiment depicted in FIG. 1B is formed of the cured-film formation composition of the present embodiment.

As depicted in FIG. 1B, the orientation material 10 of the present embodiment is structured such that the main component in the inside thereof is a polymer 4 described above and the main component near the surface thereof is the photo-alignment component 1. In other words, the orientation material 10 has a structure in which the photo-alignment component 1 is unevenly distributed near the surface thereof, and the proportion of the photo-alignment component 1 existing near the surface is made larger than that of an orientation material such as the above-described conventional photo-alignment film.

In the orientation material 10, as described above, the photo-alignment component 1 has the hydrophobic photoreactive moiety 2. In contrast, the polymer 4 that is the main component in the inside of the orientation material 10 is more hydrophilic than the photoreactive moiety 1 as describe above. Accordingly, in the orientation material 10, the photo-alignment component 1 is unevenly distributed near the surface of the orientation material 10 so that the film structure is stabilized. In this case, the photo-alignment component 1 has the hydrophilic heat-reactive moiety 3, and has a structure in which the heat-reactive moiety 3 is oriented to the inside of the orientation material 10 and the hydrophobic photoreactive moiety 2 is oriented to the surface, as depicted in FIG. 1B. In this manner, in the orientation material 10 of the present embodiment, the structure is made in which the proportion of the photoreactive moiety 2 of the photo-alignment component 1 existing near the surface is made larger, as depicted in FIG. 1B.

The cured-film formation composition of the present embodiment contains a cross-linking agent. As depicted in FIG. 1B, this cross-linking agent 5 is a cross-linking agent that thermally reacts with the heat-reactive moiety 3 of the photo-alignment component 1 and a hydroxy group and the like that the polymer 4 has, and this reaction proceeds at a temperature lower than a sublimation temperature of the photo-alignment component 1. The cross-linking agent 5 is preferably more hydrophilic than the photo-alignment component 1. The cross-linking agent 5 is distributed in the orientation material 10. In the orientation material 10, before the photo-alignment component 1 photo-reacts by exposure to light, reaction caused by the cross-linking agent 5 is activated, and the heat-reactive moiety 3 of the photo-alignment component 1 and the polymer 4 thermally react with the cross-linking agent 5. At this time, the photo-alignment component 1 hardly sublimates because the cross-linking agent 5 reacts at a temperature lower than the sublimation temperature of the photo-alignment component 1. Consequently, the cross-linking agent 5 can cross-link among a plurality of polymers 4 or cross-link the photo-alignment component 1 to the polymer 4. In this manner, the photo-reaction component 1 that is unevenly distributed near the surface of the orientation material 10 is bonded to the polymer 4 by the cross-linking agent 5, and cross-linking reaction by heat is performed also inside the orientation material 10, whereby a robust internal structure is made in the orientation material 10.

In the orientation material of the present embodiment having the above-described structure, the photo-alignment component can be unevenly distributed in the upper layer of the orientation material, whereby the efficiency of photo-reaction can be increased. After three-dimensional cross-linking with the cross-linking agent, the photoreactivity is less likely to be reduced. Furthermore, the internal structure of the orientation material of the present embodiment is strengthened by the cross-linking reaction with the cross-linking agent. Consequently, the orientation material of the present embodiment has solvent resistance, and damages due to the polymerizable liquid crystal and a solvent used with the polymerizable liquid crystal and elution of constituents can be prevented, whereby the polymerizable liquid crystal can be aligned in a highly sensitive manner.

The formation of the orientation material of the present embodiment described above can be performed by using the cured-film formation composition of the present embodiment. The cured-film formation composition of the present invention will be described in detail with reference to specific examples, and the formation of the orientation material using the cured-film formation composition and the retardation material formed with the orientation material will be described hereinafter.

<Cured-Film Formation Composition>

The cured-film formation composition of the present embodiment contains the low molecular photo-alignment component that is a component (A), the hydrophilic polymer that is a component (B), and the cross-linking agent that is a component (C). In addition to the component (A), the component (B), and the component (C), the cured-film formation composition of the present embodiment may contain a cross-linking catalyst as a component (D) and a component for enhancing adhesiveness of the cured film as a component (E). Unless the effects of the present invention are impaired, the cured-film formation composition may contain other additives.

Details of each component will be described below.

<Component (A)>

The component (A) contained in the cured-film formation composition of the present embodiment is the low molecular photo-alignment component described above.

The low molecular photo-alignment component being the component (A) can be a compound having a photo-aligning group and one substituent selected from a hydroxy group, a carboxy group, and an amino group. In the compound having a photo-aligning group and one substituent selected from a hydroxy group, a carboxy group, and an amino group, as described above, the photo-aligning group constitutes the hydrophobic photoreactive moiety in the photo-reaction component, and the hydroxy group and the like constitutes the heat-reactive moiety.

In the present invention, the photo-aligning group is a functional group of a structural moiety to be photodimerized or photoisomerized.

The structural moiety to be photodimerized is a moiety that forms a dimer by irradiation with light, and specific examples thereof include a cinnamoyl group, a chalcone group, a coumarin group, and an anthracene group. Among them, a cinnamoyl group having high transparency in the visible light range and photodimerization reactivity is preferred. In addition, the structural moiety to be photoisomerized is a structural moiety that is converted into a cis form or a trans form by irradiation with light, and specific examples thereof include a moiety containing an azobenzene structure and a moiety containing a stilbene structure. Among them, in terms of high reactivity, the azobenzene structure is preferred. The compound having a photo-aligning group and a hydroxy group is, for example, a compound of Formulae:

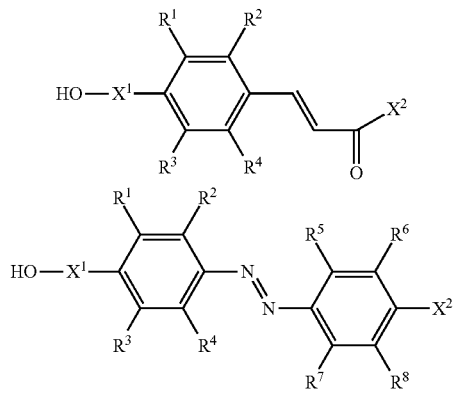

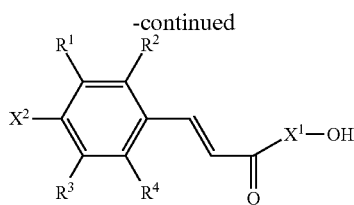

In the Formulae, $X^1$ is a single bond or is a $C_{1-18}$ alkylene group, a phenylene group, a biphenylene group, or a cyclohexylene group bonded through a covalent bond, an ether bond, an ester bond, an amide bond, an amino bond, or a urea bond. In this case, the alkylene group, the phenylene group, and the biphenylene group may be substituted with one or more substituents that are selected from a halogen atom and a cyano group and are the same as or different from each other.

In the Formulae, $X^2$ is a hydrogen atom, a cyano group, a nitro group, a $C_{1-18}$ alkyl group, a phenyl group, a biphenyl group, or a cyclohexyl group. In this case, the $C_{1-18}$ alkyl group, the phenyl group, the biphenyl group, or the cyclohexyl group may be bonded through a covalent bond, an ether bond, an ester bond, an amide bond, an amino bond, or a urea bond and the phenyl group and the biphenyl group may be substituted with any one of a halogen atom and a cyano group.

In the Formulae, $R^1$, $R^2$, $R^3$, $R^4$, $R^5$, $R^6$, $R^7$, and $R^8$ are independently a hydrogen atom, a $C_{1-4}$ alkyl group, a $C_{1-4}$ alkoxy group, a halogen atom, a trifluoromethyl group, or a cyano group.

Specific examples of the compound having a photo-aligning group and a hydroxy group that is the component (A) include 4-(8-hydroxyoctyloxy)cinnamic acid methyl ester, 4-(6-hydroxyhexyloxy)cinnamic acid methyl ester, 4-(4-hydroxybutyloxy)cinnamic acid methyl ester, 4-(3-hydroxypropyloxy)cinnamic acid methyl ester, 4-(2-hydroxyethyloxy)cinnamic acid methyl ester, 4-hydroxymethyloxycinnamic acid methyl ester, 4-hydroxycinnamic acid methyl ester, 4-(8-hydroxyoctyloxy)cinnamic acid ethyl ester, 4-(6-hydroxyhexyloxy)cinnamic acid ethyl ester, 4-(4-hydroxybutyloxy)cinnamic acid ethyl ester, 4-(3-hydroxypropyloxy)cinnamic acid ethyl ester, 4-(2-hydroxyethyloxy)cinnamic acid ethyl ester, 4-hydroxymethyloxycinnamic acid ethyl ester, 4-hydroxycinnamic acid ethyl ester, 4-(8-hydroxyoctyloxy)cinnamic acid phenyl ester, 4-(6-hydroxyhexyloxy)cinnamic acid phenyl ester, 4-(4-hydroxybutyloxy)cinnamic acid phenyl ester, 4-(3-hydroxypropyloxy)cinnamic acid phenyl ester, 4-(2-hydroxyethyloxy)cinnamic acid phenyl ester, 4-hydroxymethyloxycinnamic acid phenyl ester, 4-hydroxycinnamic acid phenyl ester, 4-(8-hydroxyoctyloxy)cinnamic acid biphenyl ester, 4-(6-hydroxyhexyloxy)cinnamic acid biphenyl ester, 4-(4-hydroxybutyloxy)cinnamic acid biphenyl ester, 4-(3-hydroxypropyloxy)cinnamic acid biphenyl ester, 4-(2-hydroxyethyloxy)cinnamic acid biphenyl ester, 4-hydroxymethyloxycinnamic acid biphenyl ester, 4-hydroxycinnamic acid biphenyl ester, cinnamic acid 8-hydroxyoctyl ester, cinnamic acid 6-hydroxyhexyl ester, cinnamic acid 4-hydroxybutyl ester, cinnamic acid 3-hydroxypropyl ester, cinnamic acid 2-hydroxyethyl ester, cinnamic acid hydroxymethyl ester, 4-(8-hydroxyoctyloxy)azobenzene, 4-(6-hydroxyhexyloxy)azobenzene, 4-(4-hydroxybutyloxy)azobenzene, 4-(3-hydroxypropyloxy)azobenzene, 4-(2-hydroxyethyloxy)azobenzene, 4-hydroxymethyloxyazobenzene, 4-hydroxyazobenzene, 4-(8-hydroxyoctyloxy)chalcone, 4-(6-hydroxyhexyloxy)chalcone, 4-(4-hydroxybutyloxy)chalcone, 4-(3-hydroxypropyloxy)chalcone, 4-(2-hydroxyethyloxy)chalcone, 4-hydroxymethyloxychalcone, 4-hydroxycalcone, 4'-(8-hydroxyoctyloxy)chalcone, 4'-(6-hydroxyhexyloxy)chalcone, 4'-(4-hydroxybutyloxy)chalcone, 4'-(3-hydroxypropyloxy)chalcone, 4'-(2-hydroxyethyloxy)chalcone, 4'-hydroxymethyloxychalcone, 4'-hydroxychalcone, 7-(8-hydroxyoctyloxy)coumarin, 7-(6-hydroxyhexyloxy)coumarin, 7-(4-hydroxybutyloxy)coumarin, 7-(3-hydroxypropyloxy)coumarin, 7-(2-hydroxyethyloxy)coumarin, 7-hydroxymethyloxycoumarin, 7-hydroxycoumarin, 6-hydroxyoctyloxycoumarin, 6-hydroxyhexyloxycoumarin, 6-(4-hydroxybutyloxy)coumarin, 6-(3-hydroxypropyloxy)coumarin, 6-(2-hydroxyethyloxy)coumarin, 6-hydroxymethyloxycoumarin, and 6-hydroxycoumarin.

Specific examples of the compound having a photo-aligning group and a carboxy group include cinnamic acid, ferulic acid, 4-nitrocinnamic acid, 4-methoxycinnamic acid, 3,4-dimethoxycinnamic acid, coumarin-3-carboxyic acid, and 4-(N,N-dimethylamino)cinnamic acid.

Specific examples of the compound having a photo-aligning group and an amino group include methyl-4-aminocinnamic acid, ethyl-4-aminocinnamic acid, methyl-3-aminocinnamic acid, and ethyl-3-aminocinnamic acid.

The low molecular photo-alignment component being the component (A) can be exemplified by the above specific examples, but is not limited to these.

When the photo-alignment component being the component (A) is the compound having a photo-aligning group and a hydroxy group, as the component (A), a compound having in the molecule two or more photo-aligning groups and/or two or more hydroxy groups can be used. More specifically, as the component (A), a compound having in the molecule one hydroxy group and two or more photo-aligning groups, a compound having in the molecule one photo-aligning group and two or more hydroxy groups, or a compound having in the molecule two or more photo-aligning groups and two or more hydroxy groups can be used. Examples of the compound having in the molecule two or more photo-aligning groups and two or more hydroxy groups include a compound of Formula:

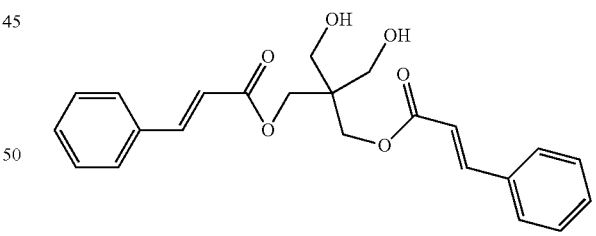

Appropriately selecting such a compound enables control for increasing the molecular weight of the photo-alignment component being the component (A). This can prevent the photo-alignment component being the component (A) from sublimating when the photo-alignment component being the component (A) and the polymer being the component (B) thermally reacts with the cross-linking agent being the component (C). Thus, the cured-film formation composition of the present embodiment can form an orientation material having high photoreaction efficiency as a cured film.

The compound of the component (A) in the cured-film formation composition of the present embodiment may be a mixture of plural types of compounds having a photo-aligning group and one substituent selected from a hydroxy group, a carboxy group, and an amino group.

<Component (B)>

The component (B) contained in the cured-film formation composition of the present embodiment is a hydrophilic polymer.

The polymer being the component (B) can be a polymer (hereinafter, also called "specific polymer") having one or more substituents selected from a hydroxy group, a carboxy group, and an amino group.

In the cured-film formation composition of the present embodiment, as the specific polymer being the component (B), a highly hydrophilic polymer having high hydrophilicity is preferably selected so as to be more hydrophilic than the component (A). The specific polymer is preferably a polymer having a hydrophilic group such as a hydroxy group, a carboxy group, and an amino group. More specifically, the specific polymer is preferably a polymer having one or more substituents (excluding a melamine formaldehyde resin, a phenol novolac resin, cyclodextrin, and polyester polycarboxylic acid) selected from a hydroxy group, a carboxy group, and an amino group.

Examples of the polymer being the component (B) include a polymer having a straight-chain structure or a branched structure such as an acrylic polymer, polyamic acid, polyimide, polyvinyl alcohol, polyester (excluding polyester polycarboxyic acid), polyether polyol, polyester polyol, polycarbonate polyol, polycaprolactone polyol, polyalkylene imine, polyallylamine, celluloses (cellulose or derivatives thereof) and a cyclic polymer such as hydroxyalkyl cyclodextrins.

Among them, as the acrylic polymer, a polymer obtained by polymerizing a monomer having an unsaturated double bond such as an acrylic acid ester, a methacrylic acid ester, and styrene can be used.

Examples of the specific polymer being the component (B) preferably include hydroxyalkyl cyclodextrins, celluloses, an acrylic polymer having at least one of a polyethylene glycol ester group and a $C_{2-5}$ hydroxyalkyl ester group and at least one of a carboxy group and a phenolic hydroxy group, an acrylic polymer having an aminoalkyl group in a side chain, polyether polyol, polyester polyol, polycarbonate polyol, and polycaprolactone polyol.

The acrylic polymer that is one preferred example of the specific polymer of the component (B) and that has at least one of a polyethylene glycol ester group and a $C_{2-5}$ hydroxyalkyl ester group and at least one of a carboxy group and a phenolic hydroxy group may be any acrylic polymer having such a structure, and the skeleton of the main chain and the type of the side chain constituting the acrylic polymer are not particularly limited.

The structure unit having at least one of a polyethylene glycol ester group and a $C_{2-5}$ hydroxyalkyl ester group is preferably a structure unit of Formula [B1] below.

The structure unit having at least one of a carboxy group and a phenolic hydroxy group is preferably a structure unit of Formula [B2] below.

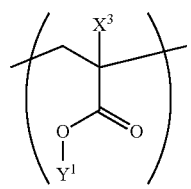
[B1]

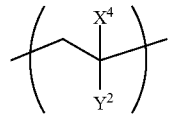
[B2]

In Formulae [B1] and [B2], $X^3$ and $X^4$ are independently a hydrogen atom or a methyl group; $Y^1$ is an $H-(OCH_2CH_2)_n-$ group (herein, the value of n is 2 to 50, and preferably 2 to 10) or a $C_{1-3}$ hydroxyalkyl group; and $Y^2$ is a carboxy group or a phenolic hydroxy group.

The acrylic polymer being an example of the component (B) has a weight-average molecular weight of preferably 3,000 to 200,000, more preferably 4,000 to 150,000, and still more preferably 5,000 to 100,000. An excessively high weight-average molecular weight exceeding 200,000 may reduce the solubility in solvent, so that the handling property may deteriorate. An excessively low weight-average molecular weight below 3,000 may cause insufficient curing during heat curing, so that the solvent resistance and the heat resistance may decrease. The weight-average molecular weight herein is a value obtained by gel permeation chromatography (GPC) using polystyrene as the standard sample. The same method is used hereinafter in the present specification.

As a method for synthesizing the acrylic polymer being an example of the component (B), a method for copolymerizing a monomer (hereinafter, also called "b1 monomer") having at least one of a polyethylene glycol ester group and a $C_{1-4}$ hydroxyalkyl ester group with a monomer (hereinafter, called "b2 monomer") having at least one of a carboxy group and a phenolic hydroxy group is simple.

Examples of the monomer having a polyethylene glycol ester group include mono acrylate or mono methacrylate of $H-(OCH_2CH_2)_n-OH$. The value of n is 2 to 50, and preferably 2 to 10.

Examples of the monomer having a $C_{2-5}$ hydroxyalkyl ester group include 2-hydroxyethyl methacrylate, 2-hydroxyethyl acrylate, 2-hydroxypropyl methacrylate, 2-hydroxypropyl acrylate, 4-hydroxybutyl acrylate, and 4-hydroxybutyl methacrylate.

Examples of the monomer having a carboxy group include acrylic acid, methacrylic acid, and vinylbenzoic acid.

Examples of the monomer having a phenolic hydroxy group include p-hydroxystyrene, m-hydroxystyrene, and o-hydroxystyrene.

In the present embodiment, when the acrylic polymer being an example of the component (B) is synthesized, another monomer, specifically a monomer having neither a hydroxy group nor a carboxy group can be used in addition to the b1 monomer and the b2 monomer unless the effects of the present invention are impaired.

Examples of this monomer include an acrylic acid ester compound such as methylacrylate, ethylacrylate, propyl acrylate, isopropyl acrylate, butyl methacrylate, butyl acrylate, isobutyl acrylate, and t-butyl acrylate; a methacrylic acid ester compound such as methyl methacrylate, ethyl methacrylate, propyl methacrylate, isopropyl methacrylate, isobutyl methacrylate, and t-butyl methacrylate; a maleimide compound such as maleimide, N-methyl maleimide, N-phenylmaleimide, and N-cyclohexyl maleimide; acrylamide compound; acrylonitrile; maleic acid anhydride; a styrene compound; and a vinyl compound.

The contents of the b1 monomer and the b2 monomer used for obtaining the acrylic polymer being an example of the component (B) are preferably 2% to 95% by mole and 5% to 98% by mole, respectively, based on the total amount of all monomers used for obtaining the acrylic polymer being the component (B).

When a monomer having only a carboxy group is used as the b2 monomer, it is preferable that the content of the b1 monomer be 60% to 95% by mole and the content of the b2 monomer be 5% to 40% by mole, based on the total amount of all monomers used for obtaining the acrylic polymer being the component (B).

When a monomer having only a phenolic hydroxy group is used as the b2 monomer, it is preferable that the content of the b1 monomer be 2% to 80% by mole and the content of the b2 monomer be 20% to 98% by mole. When the content of the b2 monomer is excessively low, the liquid crystal alignment properties of the composition are prone to be unsatisfactory, and when the content of the b2 monomer is excessively high, the compatibility with the component (A) is prone to decrease.

Although the method for obtaining the acrylic polymer being an example of the component (B) is not particularly limited, the acrylic polymer can be obtained, for example, by subjecting the b1 monomer, the b2 monomer, a monomer other than the b1 monomer and the b2 monomer if desired, and a polymerization initiator or the like to polymerization reaction in a solvent in which they coexist at a temperature of 50° C. to 110° C. The solvent used herein is not particularly limited as long as the solvent can dissolve the b1 monomer, the b2 monomer, the monomer other than the b1 monomer and the b2 monomer used if desired, and the polymerization initiator, for example. Specific examples thereof will be recited in <Solvent> described later.

Examples of the acrylic polymer having an aminoalkyl group in a side chain that is one preferred example of the specific polymer of the compound (B) include those into which aminoalkyl ester monomers such as aminoethyl acrylate, aminoethyl methacrylate, aminopropyl acrylate, and aminopropyl methacrylate are polymerized, and those into which one or more monomers selected from these aminoalkyl ester monomers and the above-described acrylic monomers are copolymerized.

The acrylic polymer being an example of the component (B) obtained by the above-described method is generally in a state of being dissolved in the solvent.

A solution of the acrylic polymer being an example of the component (B) obtained by the above mentioned method is poured into diethyl ether, water, or the like with stirring and the acrylic polymer is reprecipitated. The precipitate thus obtained is filtered and washed, and then is dried at room temperature or dried by heating under atmospheric pressure or reduced pressure. Thus, a powder of the acrylic polymer being an example of the component (B) can be prepared. By this operation, the polymerization initiator and an unreacted monomer that coexist with the acrylic polymer being an example of the component (B) can be removed, and consequently a powder of the purified acrylic polymer being an example of the component (B) can be obtained. If the acrylic polymer cannot be sufficiently purified by one operation, the obtained powder may be redissolved in a solvent, followed by repeating the above-described operation.

Examples of the polyether polyol being one preferred example of the specific polymer of the component (B) include those obtained by adding propylene oxide, polyethylene glycol, or polypropylene glycol, or the like, to polyhydric alcohol such as polyethylene glycol, polypropylene glycol, propylene glycol, bisphenol A, triethylene glycol, and sorbitol. Specific examples of the polyether polyol include ADEKA polyether P-series, G-series, EDP-series, BPX-series, FC-series, and CM-series manufactured by ADEKA Corporation; and UNIOX (registered trademark) HC-40, HC-60, ST-30E, ST-40E, G-450, and G-750, UNIOL (registered trademark) TG-330, TG-1000, TG-3000, TG-4000, HS-1600D, DA-400, DA-700, and DB-400, and NONION (registered trademark) LT-221, ST-221, and OT-221 manufactured by NOF Corporation.

Examples of the polyester polyol being one preferred example of the specific polymer of the component (B) include those obtained by causing polyhydric carboxyic acid such as adipic acid, sebacic acid, and isophthalic acid to react with diol such as ethylene glycol, propylene glycol, butylene glycol, polyethylene glycol, and polypropylene glycol. Specific examples of the polyester polyol include POLYLITE (registered trademark) OD-X-286, OD-X-102, OD-X-355, OD-X-2330, OD-X-240, OD-X-668, OD-X-2108, OD-X-2376, OD-X-2044, OD-X-688, OD-X-2068, OD-X-2547, OD-X-2420, OD-X-2523, OD-X-2555, OD-X-2560 manufactured by DIC corporation; and Polyol P-510, P-1010, P-2010, P-3010, P-4010, P-5010, P-6010, F-510, F-1010, F-2010, F-3010, P-1011, P-2011, P-2013, P-2030, N-2010, PNNA-2016, C-590, C-1050, C-2050, C-2090, and C-3090 manufactured by Kuraray Co., Ltd.

Examples of the polycaprolactone polyol being one preferred example of the specific polymer of the component (B) include those obtained by causing polyhydric alcohol such as trimethylolpropane and ethylene glycol to react with polycaprolactone. Specific examples of the polycaprolactone polyol include POLYLITE (registered trademark) OD-X-2155, OD-X-640, and OD-X-2568 manufactured by DIC Corporation; and PLACCEL (registered trademark) 205, L205AL, 205U, 208, 210, 212, L212AL, 220, 230, 240, 303, 305, 308, 312, and 320 manufactured by Daicel Chemical Industries, Ltd.

Examples of the polycarbonate polyol being one preferred example of the specific polymer of the component (B) include those obtained by causing polyhydric alcohol such as trimethylolpropane and ethylene glycol to react with polycarbonate. Specific examples of the polycarbonate polyol include PLACCEL (registered trademark) CD205, CD205PL, CD210, and CD220 manufactured by Daicel Chemical Industries, Ltd.

Example of the cellulose being one preferred example of the specific polymer of the component (B) include hydroxyalkyl celluloses such as hydroxyethyl cellulose and hydroxypropyl cellulose; and hydroxyalkyl alkyl celluloses such as hydroxyethyl methyl cellulose, hydroxypropyl methyl cellulose, and hydroxyethyl ethyl cellulose. For example, the hydroxyalkyl celluloses such as hydroxyethyl cellulose and hydroxypropyl cellulose are preferred.

Examples of the hydroxyalkyl cyclodextrin being one preferred example of the specific polymer of the component (B) include hydroxymethyl-α-cyclodextrin, hydroxymethyl-β-cyclodextrin, hydroxymethyl-γ-cyclodextrin, 2-hydroxyethyl-α-cyclodextrin, 2-hydroxyethyl-β-cyclodextrin, 2-hydroxyethyl-γ-cyclodextrin, 2-hydroxypropyl-α-cyclodextrin, 2-hydroxypropyl-β-cyclodextrin, 2-hydroxypropyl-γ-cyclodextrin, 3-hydroxypropyl-α-cyclodextrin, 3-hydroxypropyl-β-cyclodextrin, 3-hydroxypropyl-γ-cyclodextrin, 2,3-dihydroxypropyl-α-cyclodextrin, 2,3-dihydroxypropyl-β-cyclodextrin, and 2,3-dihydroxypropyl-γ-cyclodextrin.

In the cured-film formation composition of the present embodiment, the polymer of the component (B) may be used in a form of powder or in a form of solution in which the purified powder is redissolved in a solvent described later.

Furthermore, in the cured-film formation composition of the present embodiment, the polymer of the component (B) may be a mixture of multiple types of the polymer of the component (B).

<Component (C)>

The component (C) contained in the cured-film formation composition of the present embodiment is a cross-linking agent.

More specifically, the component (C) is a cross-linking agent that reacts with the component (A) and the component (B) and also reacts at a temperature lower than a sublimation temperature of the component (A). At a temperature lower than the sublimation temperature of the component (A), the component (C) binds to one of a hydroxy group, a carboxy group, and an amino group of a compound being the component (A) and one or more substituents selected from a hydroxy group, a carboxy group, and an amino group contained in the component (B). Consequently, as described later, it is possible to prevent the component (A) from sublimating when the component (A) and the component (B) thermally react with the cross-linking agent being the component (C). Thus, the cured-film formation composition of the present embodiment can form an orientation material having high photoreaction efficiency in the form of a cured film.

In the cured-film formation composition of the present embodiment, the component (C) is preferably more hydrophilic than the component (A). The purpose of this is to suitably distribute the component (C) in a film when a cured film is formed using the cured-film formation composition of the present embodiment.

Examples of the cross-linking agent being the component (C) include an epoxy compound, a methylol compound, and an isocyanate compound, and the methylol compound is preferred.

Specific examples of the methylol compound include compounds such as alkoxymethylated glycoluril, alkoxymethylated benzoguanamine, and alkoxymethylated melamine.

Specific examples of the alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(methoxymethyl)urea, 1,1,3,3-tetrakis(butoxymethyl)urea, 1,3-bis(hydroxymethyl)-4,5-dihydroxy-2-imidazolinone, and 1,3-bis(methoxymethyl)-4,5-dimethoxy-2-imidazolinone. Examples of commercially available products thereof include: compounds such as glycoluril compounds (trade name: Cymel (registered trademark) 1170, Powderlink (registered trademark) 1174), a methylated urea resin (trade name: UFR (registered trademark) 65), and butylated urea resins (trade name: UFR (registered trademark) 300, U-VAN10S60, U-VAN10R, U-VAN11HV) manufactured by Mitsui Cytec Ltd.; and urea/formaldehyde-based resins (trade name: Beckamine (registered trademark) J-300S, P-955, N; highly condensed-type) manufactured by Dainihon Ink & Chemicals Inc.

Specific examples of the alkoxymethylated benzoguanamine include tetramethoxymethyl benzoguanamine. Examples of commercially available products thereof include a product (trade name: Cymel (registered trademark) 1123) manufactured by Mitsui Cytec Ltd. and products (trade name: NIKALAC (registered trademark) BX-4000, BX-37, BL-60, BX-55H) manufactured by Sanwa Chemical Co., Ltd.

Specific examples of the alkoxymethylated melamine include hexamethoxymethyl melamine. Examples of commercially available products thereof include methoxymethyl-type melamine compounds (trade name: Cymel (registered trademark) 300, 301, 303, 350) and butoxymethyl-type melamine compounds (trade name: Mycoat (registered trademark) 506, 508) manufactured by Mitsui Cytec Ltd., and methoxymethyl-type melamine compounds (trade name: NIKALAC (registered trademark) MW-30, MW-22, MW-11, MS-001, MX-002, MX-730, MX-750, MX-035) and butoxymethyl-type melamine compounds (trade name: NIKALAC (registered trademark) MX-45, MX-410, MX-302) manufactured by Sanwa Chemical Co., Ltd.

The component (C) may also be a compound obtained by condensing a melamine compound, a urea compound, a glycoluril compound, or a benzoguanamine compound in which a hydrogen atom of an amino group is substituted with a methylol group or an alkoxymethyl group. Examples thereof include a high-molecular-weight compound produced from a melamine compound or a benzoguanamine compound described in U.S. Pat. No. 6,323,310. Examples of commercially available products of the melamine compound include a product trade-named Cymel (registered trademark) 303 (manufactured by Mitsui Cytec Ltd.), and examples of commercially available products of the benzoguanamine compound include a product trade-named Cymel (registered trademark) 1123 (manufactured by Mitsui Cytec Ltd.).

Furthermore, as the component (C), it is also possible to use a polymer produced by using an acrylamide compound or a methacrylamide compound that is substituted with a hydroxymethyl group or an alkoxymethyl group such as N-hydroxymethylacrylamide, N-methoxymethylmethacrylamide, N-ethoxymethylacrylamide, and N-butoxymethylmethacrylamide.

Examples of the polymer include a poly(N-butoxymethylacrylamide), a copolymer of N-butoxymethylacrylamide and styrene, a copolymer of N-hydroxymethylmethacrylamide and methyl methacrylate, a copolymer of N-ethoxymethylmethacrylamide and benzyl methacrylate, and a copolymer of N-butoxymethylacrylamide, benzyl methacrylate, and 2-hydroxypropyl methacrylate. The weight-average molecular weight of the polymer is 1,000 to 500,000, preferably 2,000 to 200,000, more preferably 3,000 to 150,000, and still more preferably 3,000 to 50,000.

These cross-linking agents may be used singly or in combination of two or more of them.

The content of the cross-linking agent of the component (C) in the cured-film formation composition of the present embodiment is preferably 10 to 100 parts by mass, more preferably 15 to 80 parts by mass, based on 100 parts by mass of the total amount of the compound being the component (A) and the polymer of the component (B). When the content of the cross-linking agent is excessively low, the solvent resistance and heat resistance of the cured film obtained from the cured-film formation composition decrease, and the sensitivity thereof during photo-alignment decreases. When the content of the cross-linking agent is excessively high, the photo-alignment properties and the preservation stability may deteriorate.

<Component (D)>

The cured-film formation composition of the present embodiment can further contain a cross-linking catalyst as a component (D) in addition to the component (A), the component (B), and the component (C).

The cross-linking catalyst being the component (D) can be an acid or thermal acid generator, for example. This component (D) is effective in promoting heat-curing reaction of the cured-film formation composition of the present embodiment.

The component (D) is not particularly limited as long as the component (D) is a sulfonic acid group-containing compound, hydrochloric acid or a salt thereof, or a compound that thermally decomposes to generate an acid during prebaking or postbaking, that is, a compound that thermally decomposes to generate an acid at a temperature of 80° C. to 250° C. Examples of such a compound include hydrochloric acid; and sulfonic acid such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid, and a hydrate or a salt thereof. Examples of the compound generating an acid by heat include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, N-ethyl-p-toluenesulfonamide.

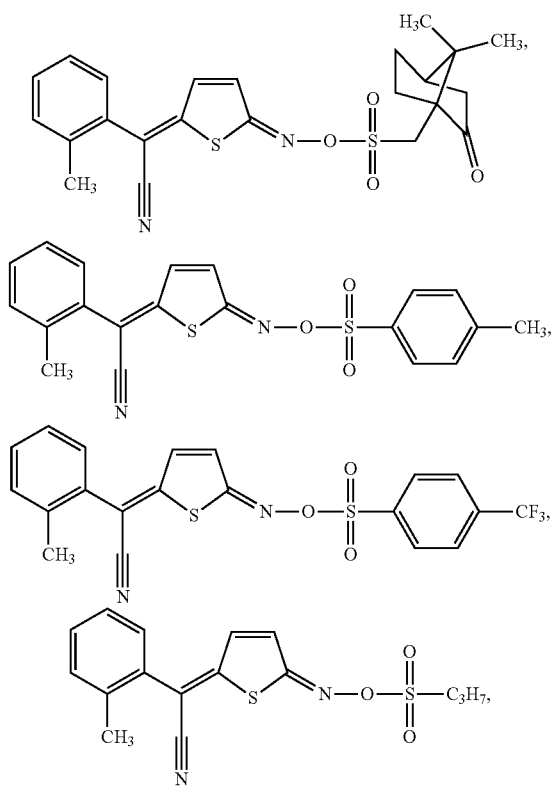

-continued

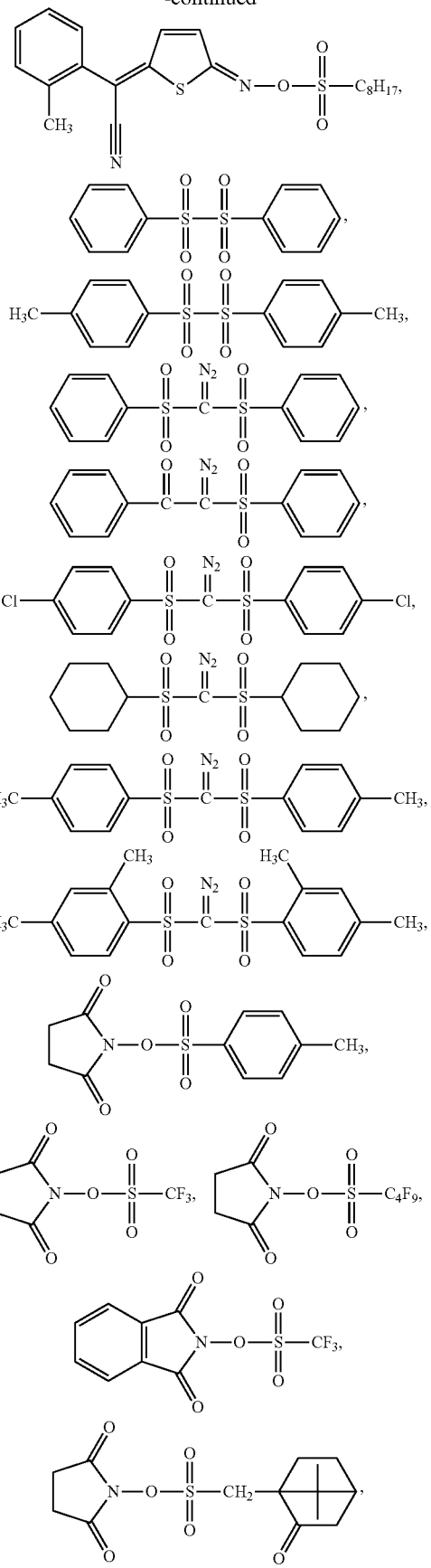

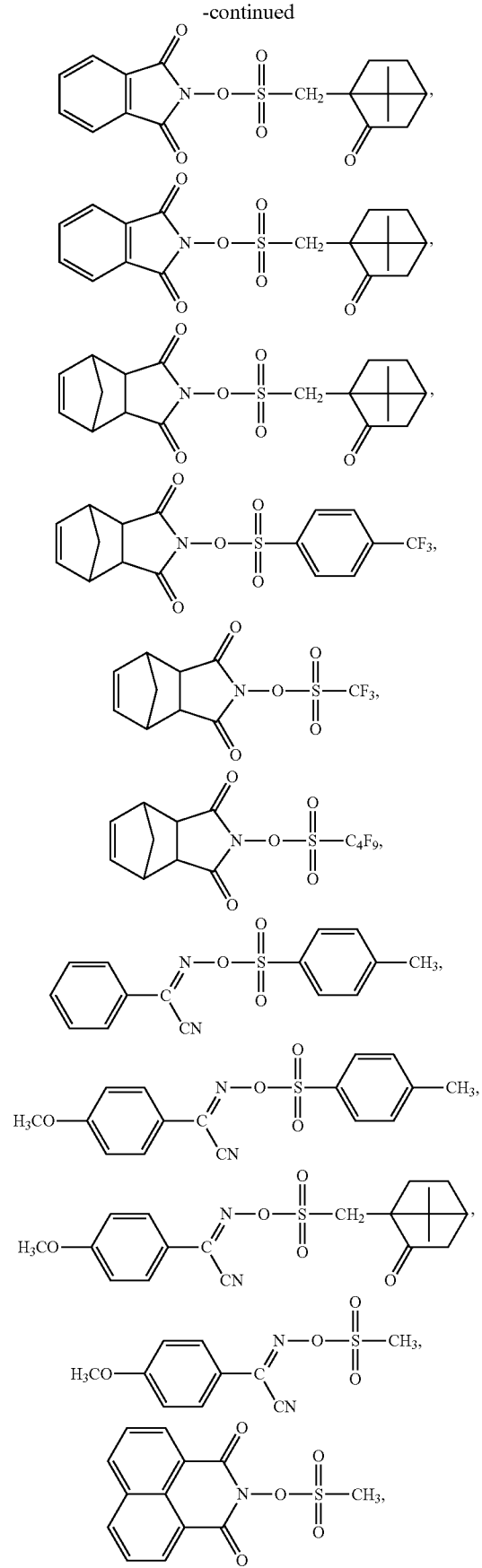
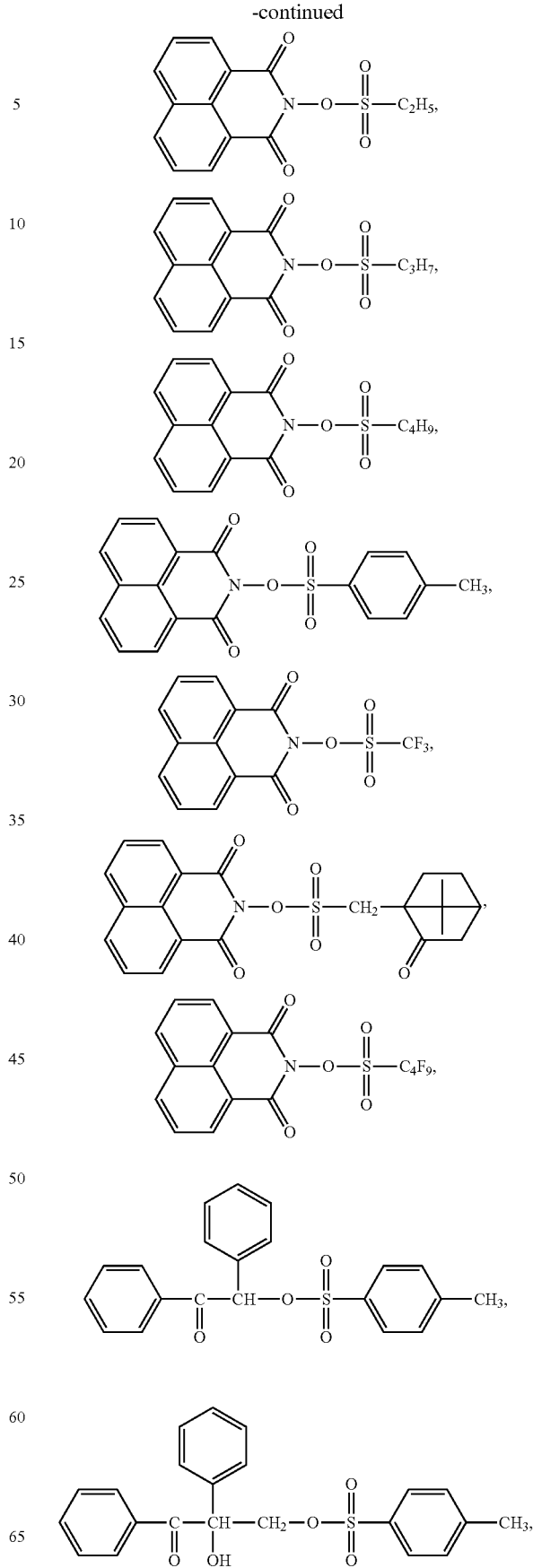

-continued

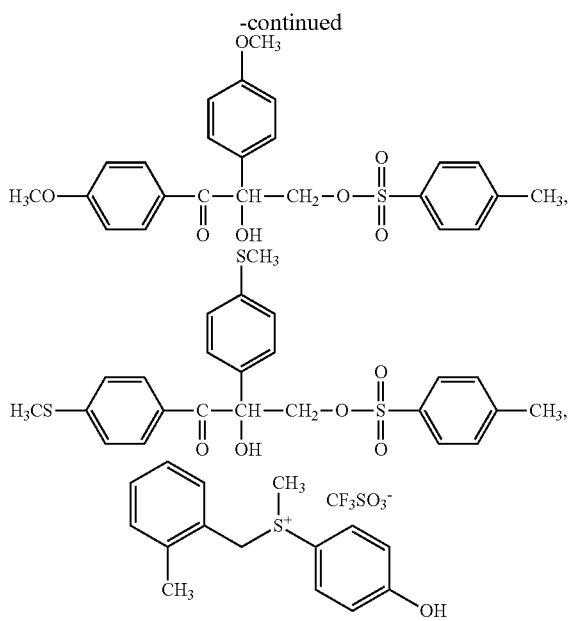

The content of the component (D) in the composition for cured-film formation composition of the present embodiment is preferably 0.01 to 10 parts by mass, more preferably 0.1 to 6 parts by mass, and still more preferably 0.5 to 5 parts by mass with respect to 100 parts by mass of the total amount of the compound of the component (A) and the polymer of the component (B). With the component (D) in a content of 0.01 parts by mass or more, satisfactory thermosetting properties and satisfactory solvent resistance can be imparted to the composition and furthermore, high sensitivity to light irradiation can also be imparted to the composition. However, when the content exceeds 10 parts by mass, the preservation stability of the composition may deteriorate.

<Component (E)>

The cured-film formation composition of the present embodiment can contain, as a component (E), a component (hereinafter, also called "adhesion enhancing component") for enhancing adhesiveness of a cured film formed in addition to the component (A), the component (B), and the component (C).

The adhesion enhancing component as the component (E) enhances the adhesion of a cured film formed of the cured-film formation composition of the present embodiment to a substrate, and enables formation of a cured film having higher reliability even on a substrate made of resin such as a TAC film, making it possible to provide a reliable orientation material.

One example of the adhesion enhancing component being the component (E) may be multifunctional acrylate (hereinafter also called "hydroxy group-containing multifunctional acrylate") containing a hydroxy group.

Examples of the hydroxy group-containing multifunctional acrylate being an example of the component (E) include pentaerythritol triacrylate and dipentaerythritol pentaacrylate.

Furthermore, examples of the component (E) include acrylic acid adduct of ethylene glycol diglycidyl ether, methacrylic acid adduct of ethylene glycol diglycidyl ether, acrylic acid adduct of polyethylene glycol diglycidyl ether, methacrylic acid adduct of polyethylene glycol diglycidyl ether, acrylic acid adduct of propylene glycol diglycidyl ether, methacrylic acid adduct of propylene glycol diglycidyl ether, acrylic acid adduct of tripropylene glycol diglycidyl ether, methacrylic acid adduct of tripropylene glycol diglycidyl ether, acrylic acid adduct of neopentyl glycol diglycidyl ether, methacrylic acid adduct of neopentyl glycol diglycidyl ether, acrylic acid adduct of 1,6-hexanediol diglycidyl ether, methacrylic acid adduct of 1,6-hexanediol diglycidyl ether, acrylic acid adduct of glycerin diglycidyl ether, methacrylic acid adduct of glycerin diglycidyl ether, acrylic acid adduct of trimethylolpropane triglycidyl ether, methacrylic acid adduct of trimethylolpropane triglycidyl ether, acrylic acid adduct of bisphenol A diglycidyl ether, and methacrylic acid adduct of bisphenol A diglycidyl ether.

The content of the hydroxy group-containing multifunctional acrylate being an example of the component (E) in the cured-film formation composition of the present embodiment is preferably 0.1 to 20 parts by mass with respect to 100 parts by mass of the total amount of the compound of the component (A) and the polymer of the component (B). With the component (E) in a content of 0.1 parts by mass or more, stronger adhesion to the substrate can be obtained. However, when the content exceeds 20 parts by mass, the preservation stability of the composition may deteriorate.

Another example as the adhesion enhancing component being the component (E) may be inorganic particles.

The inorganic particles are inorganic fine particles having an average primary particle diameter of 5 nm to 100 nm.

Examples of the inorganic particles include silica, aluminum oxide, aluminum hydroxide, talc, calcium carbonate, mica, magnesium hydroxide, tin oxide, zirconium oxide, and titanium oxide.

Among these inorganic particles, silica is preferred, and particularly colloidal silica particles having an average primary particle diameter of 5 nm to 100 nm are preferred. Colloidal silica particles having an average primary particle diameter of 5 nm to 40 nm is more preferred. The average primary particle diameter herein is the average value of primary particle diameters measured by observation with a transmission electron microscope.

As the colloidal silica particles, silica sol can be used. As the silica sol, aqueous silica sol that is produced from a sodium silicate aqueous solution as a raw material by a known method or organic solvent-dispersed silica sol that is obtained by substituting an organic solvent for water that is a disperse medium for the aqueous silica sol.

Silica sol can be used that is obtained by hydrolyzing alkoxysilane such as methyl silicate or ethyl silicate in an organic solvent such as alcohol in the presence of a catalyst (e.g., an alkali catalyst such as ammonia, organic amine compound, and sodium hydroxide) and condensing the resultant. Organo silica sol can also be used that is obtained by replacing a disperse medium of the silica sol with another solvent.

The content of the inorganic particles being an example of the component (E) in the cured-film formation composition of the present embodiment is preferably 10 to 50 parts by mass with respect to 100 parts by mass of the total amount of the compound of the component (A) and the polymer of the component (B). With the component (E) in a content of 10 parts by mass or more, stronger adhesion to the substrate can be achieved. However, when the content exceeds 50 parts by mass, the preservation stability of the composition may deteriorate.

<Solvent>

The cured-film formation composition of the present embodiment is mainly used in a solution state in which the composition is dissolved in a solvent. The type, the structure, and the like of the solvent used herein are not particularly limited as long as the solvent can dissolve the component (A), the component (B), and the component (C) and if necessary, the component (D), the component (E) and/or other additives described below.

Specific examples of the solvent include ethylene glycol monomethyl ether, ethylene glycol monoethyl ether, methylcellosolve acetate, ethylcellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone.

When a cured film is formed of the cured-film formation composition of the present embodiment on a TAC film to produce an orientation material, methanol, ethanol, isopropanol, 1-propanol, butanol, 2-methyl-1-butanol, 2-heptanone, methyl isobutyl ketone, propylene glycol monomethyl ether, propylene glycol, diethylene glycol, and propylene glycol monomethyl ether acetate are preferred because the TAC film exhibits resistance against these solvents.

These solvents may be used singly or in combination of two or more of them.

Among these solvents, ethyl acetate was found to have an effect of enhancing the adhesiveness of the cured film formed. Accordingly, using ethyl acetate as a solvent or containing ethyl acetate in a solvent can enhance the adhesion of the cured film. Thus, ethyl acetate can be used as a solvent, and also can be used as the adhesion enhancing component being the component (E).

When ethyl acetate is contained as the component, a cured film formed of the cured-film formation composition of the present embodiment has enhanced adhesion to a substrate. Even on a substrate made of a resin such as a TAC film, a cured film having higher reliability can be formed, whereby a reliable orientation material can be provided.

<Other Additives>

Furthermore, the cured-film formation compound of the present embodiment can contain, as long as not impairing the effects of the present invention and if necessary, a sensitizer, a silane coupling agent, a surfactant, a rheology adjusting agent, a pigment, a dye, a preservation stabilizer, an antifoamer, and an antioxidant, for example.

For example, the sensitizer is effective in promoting photoreaction after a heat-cured film is formed of the cured-film formation composition of the present embodiment.

Examples of the sensitizer being one example of other additives include benzophenone, anthracene, anthraquinone, thioxanthone, derivatives thereof, and a nitrophenyl compound. Among them, a benzophenone derivative and a nitrophenyl compound are preferred. Specific examples of the preferred compound include N,N-diethylaminobenzophenone, 2-nitrofluorene, 2-nitrofluorenone, 5-nitroacenaphthene, 4-nitrobiphenyl, 4-nitrocinnamic acid, 4-nitrostilbene, 4-nitrobenzophenone, and 5-nitroindole. In particular, N,N-diethylaminobenzophenone that is a derivative of benzophenone is preferred.

These sensitizers are not limited to those described above. The sensitizer may be used singly or in combination of two or more of them.

The proportion of the sensitizer used in the cured-film formation composition of the present embodiment is preferably 0.1 to 20 parts by mass, and more preferably 0.2 to 10 parts by mass with respect to 100 parts by mass of the total mass of the specific copolymer of the component (A) and the acrylic polymer of the component (B). When this proportion is excessively low, the effect as a sensitizer may not be sufficiently obtained, and when the proportion is excessively high, decrease of the transmittance and roughening of the coating film may occur.

<Preparation of Cured-Film Formation Composition>

The cured-film formation composition of the present embodiment contains a low-molecular photo-alignment component being the component (A), a polymer that is the component (B) and is more hydrophilic than the photo-alignment component of the component (A), and a cross-linking agent being the component (C). In addition to the component (A), the component (B), and the component (C), the cured-film formation composition of the present embodiment may further contain a cross-linking catalyst as the component (D) and a component for enhancing the adhesiveness of a cured film as the component (E). Unless the effects of the present invention are impaired, the cured-film formation composition may contain other additives.

The blending ratio of the component (A) to the component (B) is preferably 5:95 to 60:40 in mass ratio. When the content of the compound (B) is excessively high, the liquid crystal alignment properties are prone to deteriorate. When the content is excessively low, the solvent resistance is reduced, whereby the alignment properties are prone to be degraded.

Preferred examples of the cured-film formation composition of the present embodiment are listed below.

[1]: A cured-film formation composition in which the blending ratio of the component (A) to the component (B) is 5:95 to 60:40 in mass ratio and that contains the component (C) in an amount of 10 to 100 parts by mass based on 100 parts by mass of the total amount of the component (A) and the component (B).

[2]: A cured-film formation composition that contains the component (C) in an amount of 10 to 100 parts by mass based on 100 parts by mass of the total amount of the component (A) and the component (B), and a solvent.

[3]: A cured-film formation composition that contains the component (C) in an amount of 10 to 100 parts by mass and the component (D) in an amount of 0.01 to 10 parts by mass based on 100 parts by mass of the total amount of the component (A) and the component (B), and a solvent.

[4]: A cured-film formation composition that contains the component (C) in an amount of 10 to 100 parts by mass and the component (D) in an amount of 0.01 to 10 parts by mass based on 100 parts by mass of the total amount of the component (A) and the component (B), the component (E), and a solvent. Herein, when the component (E) is hydroxy group-containing multifunctional acrylate, the cured-film formation composition contains the hydroxy group-containing multifunctional acrylate being the component (E) in an amount of 0.1 to 20 parts by mass based on 100 parts by mass of the total amount of the component (A) and the component (B). When the component (E) is an inorganic particle, the cured-film formation composition contains the inorganic particle being the component (E) in an amount of 10 to 50 parts by mass based on 100 parts by mass of the total amount of the component (A) and the component (B).

[5]: A cured-film formation composition that contains the component (C) in an amount of 10 to 100 parts by mass and the component (D) in an amount of 0.01 to 10 parts by mass based on 100 parts by mass of the total amount of the component (A) and the component (B), and a solvent containing ethyl acetate.

The blending proportion, a preparation method, and the like, when the cured-film formation composition of the present embodiment is used as a solution will be described below in detail.

The proportion of solid content in the cured-film formation composition of the present embodiment is, but not particularly limited to as long as each component is uniformly dissolved in a solvent, 1% to 80% by mass, preferably 3% to 60% by mass, and more preferably 5% to 40% by mass. The solid content herein is a component remaining after excluding the solvent from the whole component of the cured-film formation composition.

The preparation method of the cured-film formation composition of the present embodiment is not limited to a particular method. Examples of the preparation method include a method in which the component (A), the component (C), and further the component (D), the component (E), and the like, are mixed in a solution of the component (B) dissolved in a solvent at predetermined proportions such that this solution is made uniform, or in a certain step of this preparation method, other additives are further added therein if necessary, and the resulting solution is mixed.

In the preparation of the cured-film formation composition of the present embodiment, a solution of the specific copolymer obtained by polymerization reaction in the solvent can be used without being processed. In this case, for example, the component (A), the component (C), the component (D), the component (E), and the like, are mixed in the same manner described above into a solution of the component (B) that is obtained by copolymerizing at least one of a monomer having a polyethylene glycol ester group and a monomer having a $C_{2-5}$ hydroxyalkyl ester group and at least one of a monomer having a carboxy group and a monomer having a phenolic hydroxy group, and the resulting solution is made uniform. At this time, a solvent may be further added thereto for the purpose of adjusting the concentration. In this case, the solvent used in the process of preparing the component (B) may be the same as or may be different from the solvent used for adjusting the concentration of the cured-film formation composition.

It is preferable that the solution of the cured-film formation composition thus prepared be used after being filtered with a filter having a pore diameter of about 0.2 μm.

<Cured Film, Orientation Material, and Retardation Material>

A cured film can be formed as follows: the solution of the cured-film formation composition of the present embodiment is applied onto a substrate (for example, a silicon/silicon dioxide coated substrate, a silicon nitride substrate, a substrate coated with a metal such as aluminum, molybdenum, and chromium, a glass substrate, a quartz substrate, and an ITO substrate) or a film (for example, a resin film such as a triacetylcellulose (TAC) film, a cycloolefin polymer film, a poly ethylene terephthalate film, and an acrylic film), and the like, by bar coating, rotation coating, flow coating, roll coating, slit coating, slit coating followed by rotation coating, inkjet coating, printing, or the like, to form a coating film; and then the resultant coating film is heated and dried on a hot plate or in an oven.

Cross-linking reaction caused by the cross-linking agent may proceed in such a manner that a component of an orientation material formed of the cured film is not eluted into a polymerizable liquid crystal solution applied onto the orientation material. As conditions for the heating and drying, for example, a heating temperature and a heating time that are appropriately selected from a temperature range of 60° C. to 200° C. and a time range of 0.4 minutes to 60 minutes are used. The heating temperature and the heating time are preferably 70° C. to 160° C. and 0.5 minute to 10 minutes.

The film thickness of the cured film formed of the cured-film formation composition of the present embodiment is 0.05 μm to 5 μm, for example, which can be appropriately selected in consideration of level differences and the optical and electrical properties of a substrate used.

When irradiated with polarized UV light, the cured film thus formed can function as an orientation material, that is, a member in which a compound having liquid crystallinity such as liquid crystals is aligned.

As a method for irradiation with polarized UV light, ultraviolet light to visible light having a wavelength of 150 to 450 nm are generally used, and the irradiation is performed by radiating linear polarized light in a vertical direction or an oblique direction at room temperature or in a heated state.

The orientation material formed of the cured-film formation composition of the present embodiment has solvent resistance and heat resistance. After a retardation substance including a polymerizable liquid crystal solution is applied onto the orientation material, the retardation substance is heated up to the phase transition temperature of the liquid crystal. Thus, the retardation substance is transformed into a liquid crystal state to be aligned on the orientation material. The retardation substance thus aligned is cured without being processed, whereby the retardation material can be formed as a layer having optical anisotropy.

As the retardation substance, for example, a liquid crystal monomer having a polymerizable group and a composition containing the liquid crystal monomer are used. When the substrate on which the orientation material is formed is a film, the film having the retardation material of the present embodiment is useful as a retardation film. Some of such retardation substances for forming retardation materials are transformed into a liquid crystal state to be aligned on the orientation material in a state of planar alignment, cholesteric alignment, vertical alignment, hybrid alignment, or the like, and thus can be used differently depending on retardations required.

When a patterned retarder used for a 3D display is produced, a cured film that is formed of the cured-film formation composition of the present embodiment by the above-described method is irradiated with polarized UV light in a direction of +45 degrees, for example, from a predetermined reference through a line-and-space pattern mask, and the cured film is then irradiated with polarized UV light in a direction of −45 degrees without the mask. Thus, an orientation material is obtained in which two types of liquid crystal alignment regions are formed and the directions of alignment control of liquid crystals in the regions are different. Subsequently, a retardation substance including a polymerizable liquid crystal solution is applied onto the orientation material, and is then heated up to the phase transition temperature of the liquid crystal. Thus, the retardation substance is transformed into a liquid crystal state to be aligned on the orientation material. The retardation substance thus aligned is cured without being processed, whereby a patterned retarder can be obtained in which two types of multiple retardation regions having different retardation properties are regularly arranged.

A liquid crystal display element in which a liquid crystal is aligned can be prepared by sticking together two substrates having orientation materials of the present embodiment with a spacer interposed therebetween so that the orientation materials on the respective substrates face each other, and then injecting a liquid crystal between the substrates.

The cured-film formation composition of the present embodiment can be thus suitably used for producing various retardation materials (retardation films) or liquid crystal display elements.

EXAMPLES

The present embodiment will be described in further detail with reference to examples below, but the present invention is not limited to the examples.

[Abbreviations Used in Examples]

The meanings of the abbreviations used in Examples below are as follows.

<Compound Having Photo-Aligning Group and Hydroxy Group>
CIN1: 4-hydroxyhexyloxy cinnamic acid methyl ester
CIN2: 3-methoxy-4-hydroxyhexyloxy cinnamic acid methyl ester
CIN3: reactant obtained by reaction between pentaerythritol and cinnamic acid chloride in a ratio of 1 to 3
CIN4: reactant obtained by reaction between dipentaerythritol and cinnamic acid chloride to react in a ratio of 1 to 3
CA: cinnamic acid
  <Specific Polymer Raw Material>
MAA: methacrylic acid
MMA: methyl methacrylate
HEMA: 2-hydroxyethyl methacrylate
AIBN: α,α'-azobisisobutyronitrile
PEG200: polyethylene glycol (molecular weight 200)
PEG1000: polyethylene glycol (molecular weight 1,000)
PCDO: polycaprolactone diol (molecular weight 580)
PCTO: polycaprolactone triol (molecular weight 500)
Glc-PEG: glycerin polyethylene glycol ether
Sol-PG: sorbitol polypropylene glycol ether
HPCEL: hydroxypropyl cellulose
HPCD: hydroxypropyl-β-cyclodextrin
PHEM: polyhydroxy ethyl methacrylate
PHBA: polyhydroxy butylacrylate
PEPO: polyester polyol (adipic acid/diethylene glycol copolymer) (molecular weight 4,800)

<Other Polymers>
EHPE: EHPE-3150 (1,2-epoxy-4-(2-oxirane)cyclohexane adduct of 2,2-bis(hydroxymethyl)-1-butanol) manufactured by Daicel Chemical Industries, Ltd.
ECN: epoxy cresol novolac resin
EHCEL: ethylhexyl cellulose
  <Cross-Linking Agent>
HMM: hexamethoxymethylmelamine
TMGU: 1,3,4,6-tetrakis(methoxymethyl)glycoluril
  <Cross-Linking Catalyst>
PTSA: p-toluenesulfonic acid monohydrate
  <Adhesion Enhancing Component>
PTA: pentaerythritol triacrylate
DPHA: dipentaerythritol hexaacrylate
ST: organosilica sol SNOWTEX PMA-ST manufactured by Nissan Chemical Industries, Ltd. 30 wt % PGMEA solution
SD: terminal methacryl-modified silica sol MIBK-SD manufactured by Nissan Chemical Industries, Ltd. 30 wt % MIBK solution
  <Additive>
TMPTA: trimethylolpropane triacrylate
  <Solvent>
PM: propylene glycol monomethyl ether
AcEt: ethyl acetate The number-average molecular weight and the weight-average molecular weight of the acrylic copolymer obtained according to Synthesis Examples below were measured with a GPC apparatus (manufactured by JASCO Corporation; Shodex (registered trademark) column KF 803L and KF 804L) under the condition of performing elution by flowing an elution solvent tetrahydrofuran in the column (column temperature: 40° C.) at a flow rate of 1 mL/min. The number-average molecular weight (hereinafter, called Mn) and the weight-average molecular weight (hereinafter, called Mw) were expressed as values in terms of polystyrene.

Synthesis Example 1

2.5 g of MAA, 9.2 g of MMA, 5.0 g of HEMA, and 0.2 g of AIBN as a polymerization catalyst were dissolved in 50.7 g of PM, and the resultant solution was caused to react at 70° C. for 20 hours to obtain an acrylic copolymer solution (solid content concentration: 25% by mass) (P1). Mn and Mw of the obtained acrylic copolymer were 19,600 and 45,200, respectively.

Examples 1 to 13 and Example 21

Each of cured-film formation compositions of Examples 1 to 13 and Example 21 was prepared according to the formulations given in Tables 1 and 2, and the adhesion, the alignment sensitivity, the pattern formability, and the transmittance of each thereof were evaluated.

TABLE 1

|  | (A) Component (g) | (B) Component 1 (g) | (B) Component 2 (g) | (C) Component (g) | (D) Component (g) | Solvent (g) |
|---|---|---|---|---|---|---|
| Example 1 | CIN1 1.3 | PEG200 1 | — | HMM 1.7 | PTSA 0.1 | PM 47.2 |
| Example 2 | CIN1 1.3 | PEG1000 1 | — | HMM 1.7 | PTSA 0.1 | PM 47.2 |
| Example 3 | CIN1 1.3 | PCDO 0.5 | P1 2 | HMM 1.7 | PTSA 0.1 | PM 45.7 |
| Example 4 | CIN1 1.3 | PCTO 1 | — | HMM 1.7 | PTSA 0.1 | PM 47.2 |
| Example 5 | CIN1 1.3 | Glc-PEG 1 | — | HMM 1.7 | PTSA 0.1 | PM 47.2 |

TABLE 1-continued

| | (A) Component (g) | (B) Component 1 (g) | (B) Component 2 (g) | (C) Component (g) | (D) Component (g) | Solvent (g) |
|---|---|---|---|---|---|---|
| Example 6 | CIN1 1.3 | Sol-PG 1 | — | HMM 1.7 | PTSA 0.1 | PM 47.2 |
| Example 21 | CIN1 1.3 | PEPO 1 | — | HMM 1.7 | PTSA 0.1 | PM 47.2 |

TABLE 2

| | (A) Component (g) | (B) Component 1 (g) | (C) Component (g) | (D) Component (g) | (E) Component (g) | Solvent (g) |
|---|---|---|---|---|---|---|
| Example 7 | CIN1 1 | P1 4 | HMM 1.2 | PTSA 0.08 | AcEt 5.8 | PM 38.5 |
| Example 8 | CIN1 1 | P1 4 | HMM 1.2 | PTSA 0.08 | AcEt 11.6 | PM 46.1 |
| Example 9 | CIN1 1 | P1 4 | HMM 1.2 | PTSA 0.08 | PTA 0.33 | PM 38.5 |
| Example 10 | CIN1 1 | P1 4 | HMM 1.2 | PTSA 0.08 | PTA 0.99 | PM 46.1 |
| Example 11 | CIN1 1 | P1 4 | HMM 1.2 | PTSA 0.08 | DPHA 0.33 | PM 38.5 |
| Example 12 | CIN1 1 | P1 4 | HMM 1.2 | PTSA 0.08 | ST 2.67 | PM 42.1 |
| Example 13 | CIN1 1 | P1 4 | HMM 1.2 | PTSA 0.08 | SD 2.67 | PM 42.1 |

Examples 14 to 20

Each of cured-film formation compositions of Examples 14 to 20 was prepared according to the formulation given in Table 3, and the alignment sensitivity, the pattern formability, and the transmittance of each thereof were evaluated.

TABLE 3

| | (A) Component (g) | (B) Component 1 (g) | (B) Component 2 (g) | (C) Component (g) | (D) Component (g) | Solvent (g) |
|---|---|---|---|---|---|---|
| Example 14 | CIN 1 1.3 | HPCEL 1.3 | — | HMM 1.7 | PTSA 0.1 | PM 47.2 |
| Example 15 | CIN1 1.3 | HPCD 1.3 | — | HMM 1.7 | PTSA 0.1 | PM 47.2 |
| Example 16 | CA 1.3 | P1 5.2 | — | HMM 1.7 | PTSA 0.1 | PM 40.7 |
| Example 17 | CIN 2 1.3 | HPCEL 1.3 | — | HMM 1.7 | PTSA 0.1 | PM 47.2 |
| Example 18 | CIN 3 1.3 | P1 1.3 | — | HMM 1.7 | PTSA 0.1 | PM 47.2 |
| Example 19 | CIN 4 1.3 | P1 1.3 | — | HMM 1.7 | PTSA 0.1 | PM 47.2 |
| Example 20 | CIN1 1.3 | HPCEL 1.3 | — | TMGU 1.7 | PTSA 0.1 | PM 47.2 |

Comparative Examples 1 to 4

Each of cured-film formation compositions of Comparative Examples 1 to 4 was prepared according to the formulation given in Table 4, and the alignment sensitivity, the pattern formability, and the transmittance of each thereof were evaluated.

TABLE 4

| | (A) Component (g) | (B) Component 1 (g) | (B) Component 2 (g) | (C) Component (g) | (D) Component (g) | Solvent (g) |
|---|---|---|---|---|---|---|
| Comparative Example 1 | CIN 1 1.3 | EHPE 1.3 | — | HMM 1.7 | PTSA 0.1 | PM 47.2 |

TABLE 4-continued

|  | (A) Component (g) | (B) Component 1 (g) | (B) Component 2 (g) | (C) Component (g) | (D) Component (g) | Solvent (g) |
|---|---|---|---|---|---|---|
| Comparative Example 2 | CIN 1 1.3 | ECN 1.3 | — | HMM 1.7 | PTSA 0.1 | PM 47.2 |
| Comparative Example 3 | CIN 1 1.3 | EHCEL 1.3 | — | HMM 1.7 | PTSA 0.1 | PM 47.2 |
| Comparative Example 4 | CIN 1 1.3 | HPCEL 1.3 | — | — | PTSA 0.1 | PM 47.2 |

[Evaluation of Adhesion]

A TAC film was spin coated with each of the cured-film formation compositions of Examples by a spin coater at 2000 rpm for 30 seconds, and then the resultant film was heated and dried at 110° C. for 120 seconds in a heat circulation oven to form a cured film. This cured film was vertically irradiated with linear polarized light of 313 nm at 50 mJ/cm$^2$. The substrate thus irradiated was coated with a polymerizable liquid crystal solution RMS03-013C for planar alignment manufactured by Merck Ltd., Japan with a spin coater, and then the resultant substrate was prebaked on a hot plate at 60° C. for 60 seconds and a coating film having a film thickness of 1.0 μm was formed. This film was exposed at 1000 mJ/cm$^2$ to prepare a retardation material. A cross cut (1 mm×1 mm×100 squares) was made with a utility knife into the retardation material on the substrate obtained, and a piece of cellophane tape was then adhered thereon. Subsequently, the cellophane tape was pulled off, and the number of squares of films remaining on the substrate without being peeled was counted. Those having 90 or more squares of films remaining without being peeled were determined to be excellent in adhesion.

[Evaluation of Alignment Sensitivity]

A TAC film was spin coated with each of the cured-film formation compositions of Examples and Comparative Examples with a spin coater at 2000 rpm for 30 seconds, and then the resultant film was heated and dried at 110° C. for 120 seconds in a heat circulation oven to form a cured film. This cured film was vertically irradiated with linear polarized light of 313 nm to form an orientation material. The orientation material on the substrate was coated with a polymerizable liquid crystal solution RMS03-013C for planar alignment manufactured by Merck Ltd., Japan with a spin coater, and then the resultant substrate was prebaked on a hot plate at 60° C. for 60 seconds and a coating film having a film thickness of 1.0 μm was formed. This coating film on the substrate was exposed at 1000 mJ/cm$^2$ to prepare a retardation material. The retardation material on the substrate prepared was sandwiched between a pair of polarizing plates, and the emergence of retardation properties in the retardation material was observed. The exposure amount of polarized UV light that was necessary for the orientation material to exhibit liquid crystal alignment properties was determined to be the alignment sensitivity.

[Evaluation of Pattern Formability]

A TAC film was spin coated with each of the cured-film formation compositions of Examples and Comparative Examples with a spin coater at 2000 rpm for 30 seconds, and then the resultant film was heated and dried at 110° C. for 120 seconds in a heat circulation oven to form a cured film. This cured film was vertically irradiated with linear polarized light of 313 nm at 30 mJ/cm$^2$ through a line-and-space pattern mask of 100 μm. After the mask was removed, the substrate was rotated 90 degrees, and was then vertically irradiated with linear polarized light of 313 nm at 15 mJ/cm$^2$. Thus, an orientation material was obtained in which two types of liquid crystal alignment regions were formed and the directions of alignment control of liquid crystals in the regions were different by 90 degrees. This orientation material on the substrate was coated with a polymerizable liquid crystal solution RMS03-013C for planar alignment manufactured by Merck Ltd., Japan with a spin coater, and then the resultant substrate was prebaked on a hot plate at 60° C. for 60 seconds and a coating film having a film thickness of 1.0 m was formed. This coating film on the substrate was exposed at 1000 mJ/cm$^2$ to prepare a patterned retarder. The patterned retarder prepared on the substrate was observed with a polarizing microscope. Those on which a retardation pattern was formed without alignment failure were evaluated as "○", and those on which alignment failure was observed were evaluated as "X".

[Evaluation of Light Transmittance (Transparency)]

A quartz substrate was coated with each of the cured-film formation compositions of Examples and Comparative Examples with a spin coater at 2000 rpm for 30 seconds, and then the resultant film was baked by heating and drying at 110° C. for 120 seconds on a hot plate and a cured film having a film thickness of 300 nm was formed. The film thickness was measured with F20 manufactured by Filmetrics, Inc. The transmittance of this cured film to light having a wavelength of 400 nm was measured with an ultraviolet-visible spectrophotometer (SHIMAZU UV-2550 manufactured by Shimadzu Corporation).

[Evaluation Results]

Results of the above-described evaluations are given in Table 5, Table 6, Table 7, and Table 8 below.

TABLE 5

|  | Adhesion | Alignment Sensitivity (mJ/cm$^2$) | Pattern Formation | Transmittance (%) |
|---|---|---|---|---|
| Example 1 | 100/100 | 10 | ○ | 100 |
| Example 2 | 100/100 | 10 | ○ | 100 |
| Example 3 | 100/100 | 10 | ○ | 100 |
| Example 4 | 95/100 | 10 | ○ | 100 |
| Example 5 | 100/100 | 10 | ○ | 100 |
| Example 6 | 100/100 | 10 | ○ | 100 |
| Example 21 | 100/100 | 10 | ○ | 100 |

TABLE 6

|  | Adhesion | Alignment Sensitivity (mJ/cm$^2$) | Pattern Formation | Transmittance (%) |
|---|---|---|---|---|
| Example 7 | 96/100 | 10 | ○ | 100 |
| Example 8 | 100/100 | 10 | ○ | 100 |
| Example 9 | 91/100 | 10 | ○ | 100 |
| Example 10 | 100/100 | 15 | ○ | 100 |
| Example 11 | 100/100 | 15 | ○ | 100 |

TABLE 6-continued

|  | Adhesion | Alignment Sensitivity (mJ/cm²) | Pattern Formation | Transmittance (%) |
|---|---|---|---|---|
| Example 12 | 90/100 | 30 | ○ | 100 |
| Example 13 | 100/100 | 30 | ○ | 100 |

Examples 1 to 13 and Example 21 exhibited excellent adhesion on the TAC film. All of them exhibited liquid crystal alignment properties with a small exposure amount and high alignment sensitivity, and optical patterning could be performed. All of them also exhibited high transmittance.

TABLE 7

|  | Alignment Sensitivity (mJ/cm²) | Pattern Formation | Transmittance (%) |
|---|---|---|---|
| Example 14 | 10 | ○ | 100 |
| Example 15 | 15 | ○ | 100 |
| Example 16 | 10 | ○ | 100 |
| Example 17 | 10 | ○ | 100 |
| Example 18 | 30 | ○ | 100 |
| Example 19 | 30 | ○ | 100 |
| Example 20 | 10 | ○ | 100 |

TABLE 8

|  | Alignment Sensitivity (mJ/cm²) | Pattern Formation | Transmittance (%) |
|---|---|---|---|
| Comparative Example 1 | X | X | 100 |
| Comparative Example 2 | X | X | 100 |
| Comparative Example 3 | X | X | 100 |
| Comparative Example 4 | X | X | 100 |

Examples 14 to 20 exhibited liquid crystal alignment properties with a small exposure amount and exhibit high alignment sensitivity, and optical patterning could be performed. All of them also exhibited high transmittance.

Comparative Examples 1 to 4 in which a hydrophobic polymer was used exhibited low alignment sensitivity, and it was difficult to perform optical patterning.

DESCRIPTION OF THE REFERENCE NUMERALS

1 . . . photo-alignment component, 2 . . . photoreactive moiety, 3 . . . heat-reactive moiety, 4 . . . polymer, 5 . . . cross-linking agent, 10 . . . orientation material

INDUSTRIAL APPLICABILITY

The cured-film formation composition according to the present invention is very useful as a liquid crystal alignment film for a liquid crystal display element or an orientation material for forming an optically anisotropic film that is provided inside or outside the liquid crystal display element, and is particularly suitable as a material for forming a patterned retarder for a 3D display. Furthermore, the cured-film formation composition is suitable as a material for forming a cured film such as a protective film, a planarization film, and an insulation film in various displays such as a thin film transistor (TFT) liquid crystal display element and an organic EL element, particularly as a material for forming an interlayer insulation film of a TFT liquid crystal element, a protective film for a color filter, an insulation film of an organic EL element, or the like.

The invention claimed is:
1. A cured-film formation composition comprising:
a component (A) that is a compound selected from the group consisting of

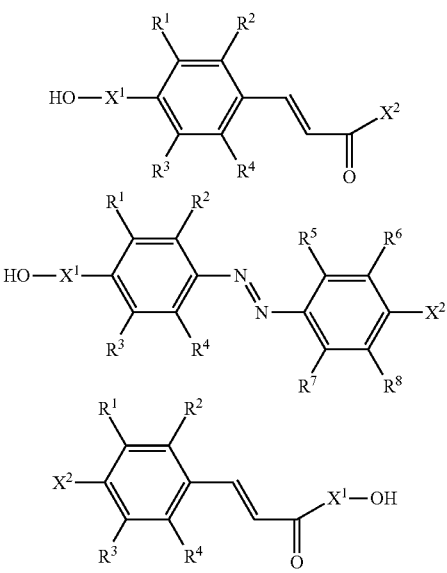

wherein $X^1$ is a single bond or is a $C_{1-18}$ alkylene group, a phenylene group, a biphenylene group, or a cyclohexylene group bonded through a covalent bond, an ether bond, an ester bond, an amide bond, an amino bond, or a urea bond; the alkylene group, the phenylene group, and the biphenylene group optionally substituted with one or more substituents that are selected from a halogen atom and a cyano group and are the same as or different from each other;
$X^2$ is a hydrogen atom, a cyano group, a $C_{1-18}$ alkyl group, a phenyl group, a biphenyl group, or a cyclohexyl group; the $C_{1-18}$ alkyl group, the phenyl group, the biphenyl group, and the cyclohexyl group optionally bonded through a covalent bond, an ether bond, an ester bond an ainide bond, an amino bond, or a urea bond; and the phenyl group and the biphenyl group optionally substituted with any one of a halogen atom and a cyano group; and
$R^1$, $R^2$, $R^3$, $R^4$, $R^5$, $R^6$, $R^7$, and $R^8$ are independently a hydrogen atom, a $C_{1-4}$ alkyl group, a $C_{1-4}$ alkoxy group, a halogen atom, a trifluoromethyl group, or a cyano group;
a component (B) that is a hydrophilic polymer (excluding a melamine formaldehyde resin, a phenol novolac resin, cyclodextrin, and polyester polycarboxylic acid) having one or more substituents selected from a hydroxy group, a carboxy group, and an amino group; and
a component (C) that is a cross-linking agent that reacts with the component (A) and the component (B) and reacts at a temperature lower than a sublimation temperature of the component (A), wherein when the component (B) is an acrylic polymer, the cured-film formation composition further comprises a component (E) that is an adhesion enhancing component.

2. The cured-film formation composition according to claim 1, wherein
the component (B) is at least one hydrophilic polymer selected from the group consisting of polyether polyol, polyester polyol, polycarbonate polyol, and polycaprolactone polyol.

3. The cured-film formation composition according claim 1, wherein
the component (B) is cellulose or a derivative of cellulose.

4. The cured-film formation composition according to claim 1, wherein
the component (B) is an acrylic polymer having at least one of a polyethylene glycol ester group and a $C_{2-5}$ hydroxyalkyl ester group, and at least one of a carboxy group and a phenolic hydroxy group.

5. The cured-film formation composition according to claim 1, wherein
the component (B) is an acrylic copolymer obtained by polymerization reaction of monomers containing at least one of a monomer having a polyethylene glycol ester group and a monomer having a $C_{2-5}$ hydroxyalkyl ester group and at least one of a monomer having a carboxy group and a monomer having a phenolic hydroxy group.

6. The cured-film formation composition according to claim 1, wherein
the cross-linking agent of the component (C) is a cross-linking agent having a methylol group or an alkoxymethylol group.

7. The cured-film formation composition according to claim 1, further comprising:
a cross-linking catalyst as a component (D).

8. The cured-film formation composition according to claim 1, wherein
the component (E) is hydroxy-group-containing multifunctional acrylate.

9. The cured-film formation composition according to claim 1, wherein
the component (E) is an inorganic particle.

10. The cured-film formation composition according to claim 1, wherein
the component (E) is ethyl acetate.

11. The cured-film formation composition according to claim 1, wherein
a ratio of the component (A) to the component (B) is 5:95 to 60:40 in a mass ratio.

12. The cured-film formation composition according to claim 1, wherein
10 parts by mass to 100 parts by mass of the cross-linking agent of the component (C) is contained based on 100 parts by mass of the total amount of the component (A) and the component (B).

13. The cured-film formation composition according to claim 7, wherein
0.01 parts by mass to 10 parts by mass of the cross-linking catalyst of the component (D) is contained based on 100 parts by mass of the total amount of the component (A) and the component (B).

14. The cured-film formation composition according to claim 8, wherein
0.1 parts by mass to 20 parts by mass of the hydroxy-group-containing multifunctional acrylate of the component (E) is contained based on 100 parts by mass of total amount of the component (A) and the component (B).

15. The cured-film formation composition according to claim 9, wherein
10 parts by mass to 50 parts by mass of the inorganic particle of the component (E) is contained based on 100 parts by mass of the total amount of the component (A) and the component (B).

16. An orientation material obtained with the cured-film formation composition as claimed in claim 1.

17. A retardation material formed with a cured film that is obtained from the cured-film formation composition as claimed in claim 1.

18. The cured-film formation composition according to claim 1, wherein the compound of component (A) is

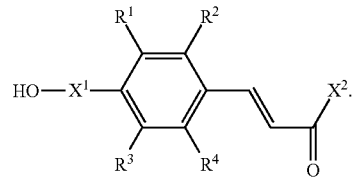

19. The cured-film formation composition according to claim 1, wherein the compound of component (A) is

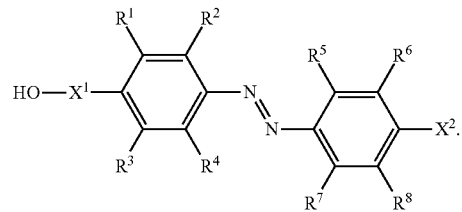

20. The cured-film formation composition according to claim 1, wherein the compound of component (A) is

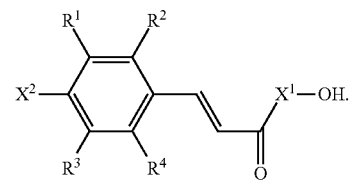

* * * * *